United States Patent [19]

Teske

[11] Patent Number: 4,458,807
[45] Date of Patent: Jul. 10, 1984

[54] CONVEYOR CHAIN

[76] Inventor: Lothar Teske, D-5000 Cologne 90, Fed. Rep. of Germany

[21] Appl. No.: 386,650

[22] Filed: Jun. 9, 1982

[30] Foreign Application Priority Data

Jun. 26, 1981 [DE] Fed. Rep. of Germany ....... 3125111

[51] Int. Cl.³ .......................................... B65G 19/24
[52] U.S. Cl. ..................................... 198/731; 474/220
[58] Field of Search ...................... 198/731, 733, 712; 474/220, 219

[56] References Cited

U.S. PATENT DOCUMENTS

| 1,186,774 | 6/1916 | Harris | 198/731 X |
| 2,822,915 | 2/1958 | Hampton | 198/733 |
| 3,021,718 | 2/1962 | King . | |
| 3,056,308 | 10/1962 | Burrows | 474/220 |
| 3,089,579 | 5/1963 | Beck | 198/731 |

FOREIGN PATENT DOCUMENTS 898878  7/1949  Fed. Rep. of Germany .
2416289 4/1974 Fed. Rep. of Germany .

Primary Examiner—Joseph E. Valenza
Assistant Examiner—Dennis J. Williamson
Attorney, Agent, or Firm—Karl F. Ross; Herbert Dubno

[57] ABSTRACT

A conveyor chain has longitudinally elongated coupling links having transverse throughgoing bores and longitudinally elongated entrainment links each formed with a transversely throughgoing window having a relatively wide central section and a pair of opposite relatively narrow end sections centered on respective parallel and transverse axes. Respective coupling pins have central regions of a cross-sectional size that can fit axially through the central section but not through the end section of the respective entrainment link and ends formed with axially limited regions of reduced cross-sectional size interfittable with the ends of the windows. These limited regions have end faces axially flanking the respective entrainment link. Thus the pins pivotally connect the links together into an annular succession with the entrainment and coupling links normally alternating with each other. Respective entrainment devices extend axially through the windows between the respective pins and are of a dimension measured in the plane of the respective axes that is generally equal to the spacing between the pins when same are engaged in the respective end sections and are generally centered on the respective axes. The entrainment devices are each secured against axial movement relative to the respective entrainment links.

20 Claims, 8 Drawing Figures

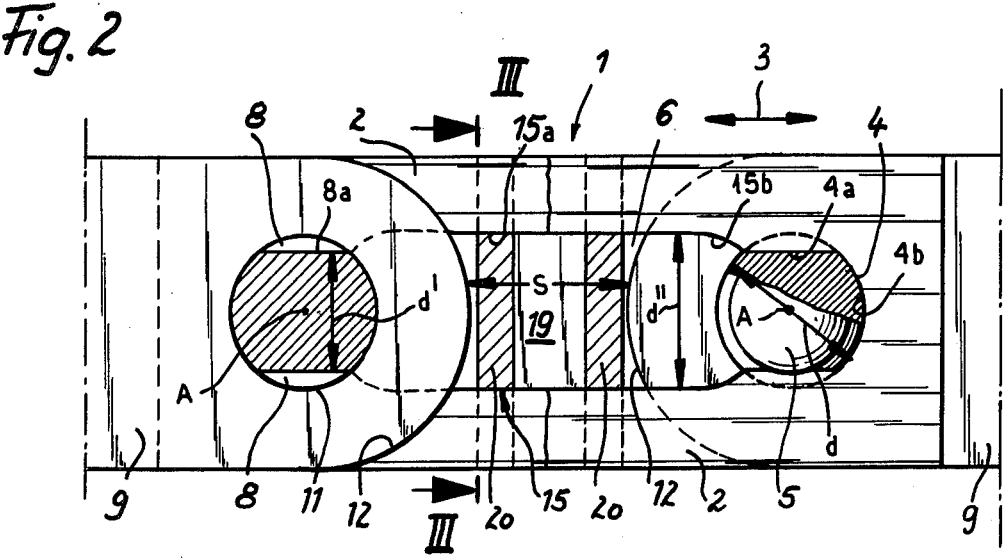
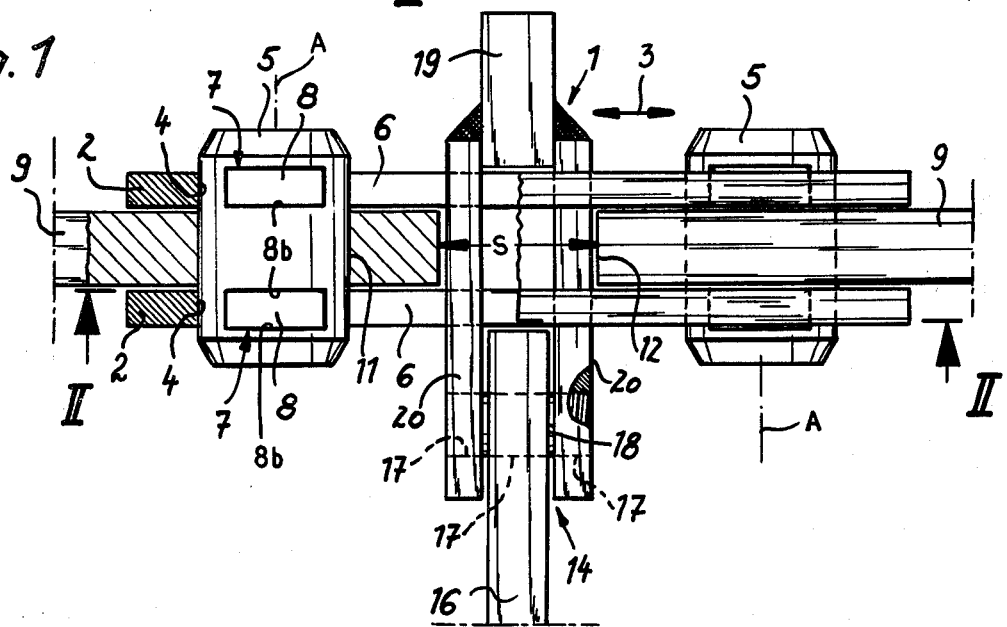
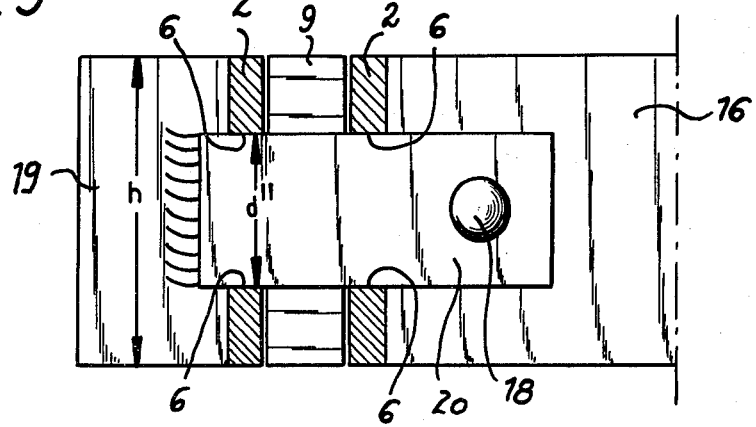

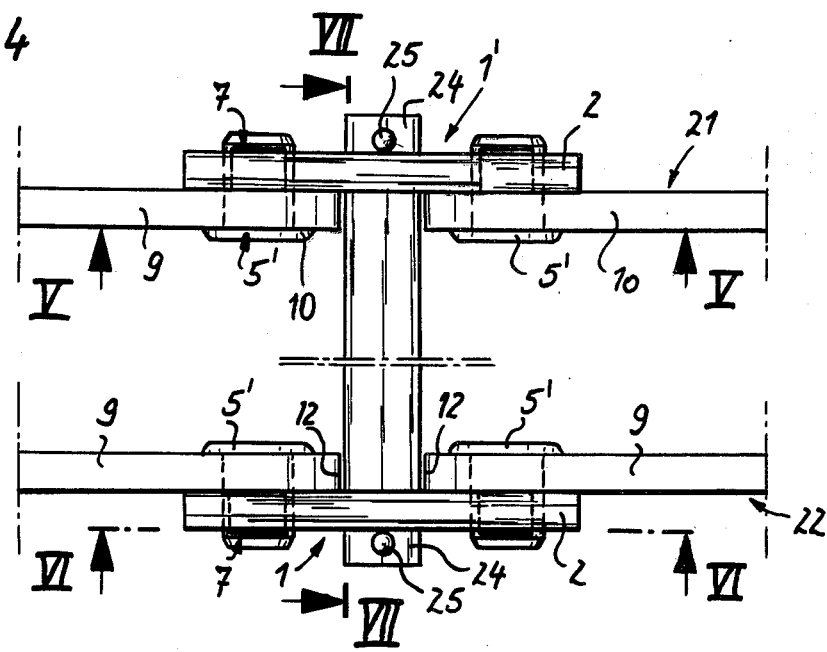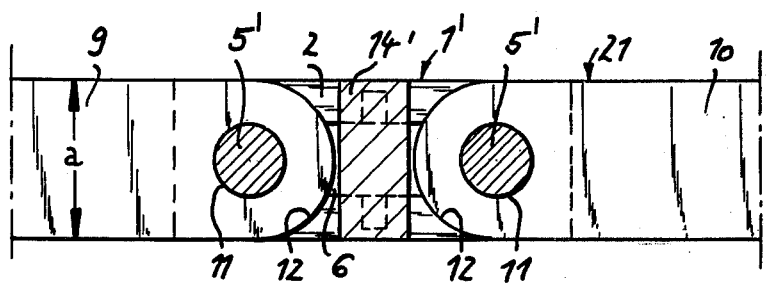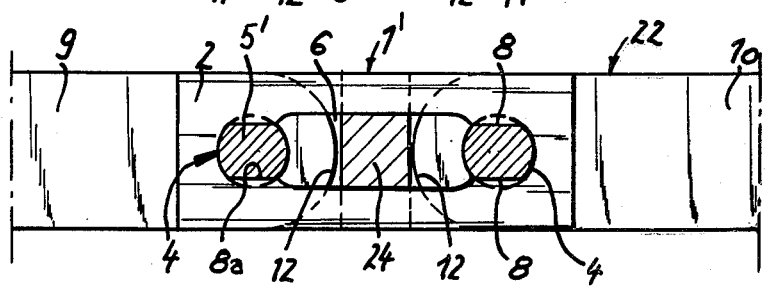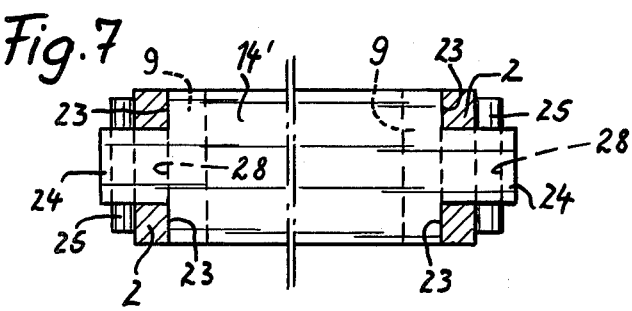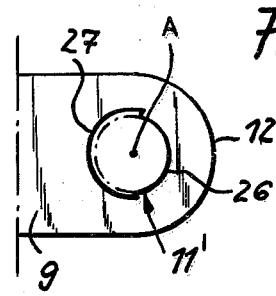

CONVEYOR CHAIN

FIELD OF THE INVENTION

The present invention relates to a link-type chain for a conveyor. More particularly this invention concerns an entrainment chain for a drag or scraper-type conveyor.

BACKGROUND OF THE INVENTION

A trough-type scraper conveyor has a chain that extends and is advanced longitudinally in a trough to move large particulate material such as ore or coal longitudinally in the trough. To this end the chain has a succession of links, with so-called coupling links alternating with entrainment links and entrainment devices such as scrapers, plates, or even buckets are attached to the entrainment links. The coupling links merely serve to transmit longitudinal force along the normally tensioned chain.

The links of a standard such chain are simple longitudinally extending link plates interconnected by transverse pivot pins that extend through bores at the ends of the link plates. The pins each have one end formed with a head and an opposite end formed with a transversely throughgoing passage through which a cotter pin or the like extends to prevent the respective pin from moving along its own axis transverse to the respective link plates relative to the chain. The entrainment elements in turn are bolted or welded to the sides of the entrainment links between the respective pins. Such an arrangement therefore has quite a few parts and is burdensome to assembly, particularly when making repairs in the field.

In addition it is possible, as seen in German Patent document No. 2,416,289 based on an application filed Apr. 4, 1973 in Italy by G. DiRosa, to form one of the plates of the entrainment link with a tab constituting an entrainment element. In this system the pivot pins have T-heads which can be engaged in transverse grooves of the entrainment links. Such a system is fairly handy, but requires meticulously cast and/or machined link plates that are expensive to fabricate. What is more when the chain is slack it is possible for the pins to move into a position in which they can come loose from the respective links.

It is known from other types of chains to provide specially made link pins which can be installed without the use of further parts, and which are fairly secure once in place. For instance German Patent No. 898,878 based on patent applications filed in Britian Sept. 29, 1948 and Sept. 15, 1949 by D. M. King discloses an arrangement wherein link has two parts, a U-shaped element whose legs have rounded ends and which are formed with respective aligned keyhole-shaped holes, and a pin having a diameter equal to that of the round part of the respective hole and two pairs of grooves allowing it to slide into the straight and narrow part of the respective hole. The aligned keyholes are spaced in from the free ends of the respective legs and the bights interconnecting these legs are so constructed that they can only be positioned to surround the respective keyhole round part when perpendicular to the respective link plate. The pin can then be fitted through the hole and then slid back with the other link to move into the narrow section and allow the two links to move into longitudinal allignment. So long as such a chain remains fairly straight, the pin cannot fall out. Such an arrangement is not usable in a conveyor chain which occasionally jams from overloading so that a portion of the chain downstream of the overload can be left completely slack and even bent over itself, as in this position the pivot pins could fall out and allow the chain to open up.

U.S. Pat. No. 3,021,718 also of D. M. King suggests a solution to this problem in a chain whose every other link is formed by a a pair of adjacent closed and longitudinally elongated loops into whose ends a longitudinal brace forces the pivot pins. Presumably the brace exerts continuous longitudinal pressure keep the pins in place. Obviously such a system could not stand the shocks and rough treatment of use in a conveyor chain, where the pins could be counted on to fall out in short order.

OBJECTS OF THE INVENTION

It is therefore an object of the present invention to provide an improved conveyor chain.

Another object is the provision of such a conveyor chain which overcomes the above-given disadvantages.

A further object is to provide a conveyor chain usable, for instance, in a scraper-type conveyor, which can be assembled without the use of extra parts or special tools, but which once assembled can be counted on to stay together even under conditions of very rough use.

SUMMARY OF THE INVENTION

These objects are attained according to the instant invention in a conveyor chain having longitudinally elongated coupling links having transverse throughgoing bores and longitudinally elongated entrainment links each formed with a transversely throughgoing window having a relatively wide central section and a pair of opposite relatively narrow end sections centered on respective parallel and transverse axes. Respective coupling pins have central regions of a cross-sectional size that can fit axially through the central section but not through the end section of the respective entrainment link and ends formed with axially limited regions of reduced cross-sectional size interfittable with the ends of the windows. These limited regions have end faces axially flanking the respective entrainment link. Thus the pins pivotally connect the links together into an annular succession with the entrainment and coupling links normally alternating with each other. Respective entrainment devices extend axially through the windows between the respective pins and are of a dimension measured in the plane of the respective axes that is generally equal to the spacing between the pins when same are engaged in the respective end sections and are generally centered on the respective axes. Means is provided for securing the entrainment devices against axial movement relative to the respective entrainment links.

Thus with the system according to the present invention the two pins must move longitudinally away from the respective link ends to be axially movable relative to the respective link, generally as in the above discussed King patent. This cannot happen, however, as the entrainment device is between them, and it can only be removed axially, in a direction in which no substantial force is effective on it.

According to another feature of this invention the limited regions are of noncircular cross-section and the respective end sections are complementarily shaped. This makes the pins nonrotatable about the respective axes in the entrainment links. In addition the coupling links have rounded ends with centers of curvature at the respective axes. In this manner the rounded ends are engageable longitudinally with the entrainment devices, which therefore are pushed by the coupling link ends. This type of action ensures that the drag created in the chain by the entrainment devices is effectively transmitted longitudinally to the chain, effective against the ends of the solidly connected coupling links. Fixing the pins against rotation relative to the entrainment links reduces the possibility of wear between these two parts.

More specifically, according to further features of this invention, the entrainment links each include two parallel entrainment-link plates each formed with one such window and flanking the respective coupling links. The window is elongated longitudinally of the respective entrainment links. The pins are each formed with two such limited regions engaged in the respective entrainment-link plates. The limited regions are each formed by at least one chordal and radially outwardly open groove. When they are, instead, each formed by a pair of such grooves open diametrally oppositely and having parallel bases, the end sections have parallel side surfaces generally engageable with the respective groove bases. Such construction makes the rotational coupling between the entrainment links and the pins very strong and very easy to build into the parts. The entrainment-link plates can be simple flat castings or even stampings with two planar parallel faces and cut from standard bar stock, and the coupling-link plates can be similarly flat and cut from bar stock. The pins need merely have the grooves machined in them is a simple machining operation.

In accordance with other features of this invention the entrainment devices each have a part engaging axially through the respective window between the respective pins, are each formed to one side of the respective entrainment link with a shoulder engaging thereagainst, and are each engaged to the other side of the respective entrainment link by the respective means. More particularly the entrainment devices each include a relatively tall body, measured perpendicular to the plane of the respective two axes, to one side of the respective entrainment link, a projection extending from the body to the other side of the respective entrainment link, and an entrainment element connected by the respective means to the projection. Such construction is extremely simple and effectively prevents accidental coming-apart of the links. Even if the chain is accidentally shortened and crimped, the pins will not be able to move into the center of the window where they could slip axially out of place, thereby opening the respective link.

The entrainment-device projection can be is formed by a pair of parallel legs embracing the entrainment element, in which case the securing means include respective locking bolts extending through each pair of legs and the respective entrainment element. Such a locking bolt can be a cotter pin, a split tube-type lock pin, can be threaded into one or both of the respective bores, or can simply be a solid pin force-fitted in place. The pairs of legs are parallel to the axes and each longitudinally engage the longitudinally preceding and following coupling links. They are formed with respective bores in which the respective bolts are force fitted. Such a bolt resists displacement in a direction perpendicular to itself, so there will be no vector of force urging it out of position. In addition such an entrainment fork can easily and effectively be connected to the respective scraper plate or the like.

In one arrangement according to this invention the chain is double, with two such annular successions next to each other. The bodies lie between adjacent entrainment links and each have two such projections extending through the respective adjacent entrainment links. Thus the entrainment devices lie mainly between and bridge the successions. A standard scraper chain, with the entrainment element between tow side chains, can therefore be made with this system, and will benefit from all of the advantages of the instant invention.

In accordance with further features of this invention the transversely throughgoing bores are each at least partially cylindrical, centered on the respective axes, and of generally the same radius of curvature as the central region of the respective pin. These bores can be wholly cylindrical.

It is also possible, according to another feature of this invention, for the transversely throughgoing bores each to have a cylindrical surface portion concave longitudinally away from the other axis of the respective entrainment element, centered on the respective axis, and of generally the same radius of curvature as the central region, and another surface portion concave longitudinally toward the other axis of the respective entrainment element and spacedly surrounding the respective central region. The other surface portions are cylindrical and centered on the respective axis, but of larger radius of curvature than the respective one surfaces. More specifically the one surface portions extend over slightly less than 180°. Thus the respective pins can move limitedly longitudinally in the bores. According to this feature the bores are each formed with a radially extending step between the respective surface portions and having a sharp edge slidable along the respective central region.

With this type of arrangement the system will be at least partially self cleaning. The sharp edges will scrape any foreign matter from the pins, so that at this one location where there is a lot of relative motion the system will effectively maintain itself.

DESCRIPTION OF THE DRAWING

The above and other features and advantages will become more readily apparent from the following, reference being made to the accompanying drawing in which:

FIG. 1 is a top partly sectional view of a portion of the chain according to the instant invention;

FIG. 2 is a section taken along line II—II of FIG. 1;

FIG. 3 is a section taken along line III—III of FIG. 2;

FIG. 4 is a top view of a portion of another chain according to the invention;

FIGS. 5, 6, and 7 are sections taken along line V—V, VI—VI, and VII—VII of FIG. 4; and FIG. 8 is an end view of a variation on the chain link of the invention.

SPECIFIC DESCRIPTION

A conveyor chain as shown in FIGS. 1-3 has a plurality of entrainment links 1 and coupling links 9, normally alternating with each other. Each entrainment link 1 is formed of two like rectangular link plates 2 each formed with an elongated central window 6 having a wide center 15 and a pair of narrow ends 4, the latter centered on parallel axes A. The links 9 are formed at their ends with transversely throughgoing cylindrical holes 11 of a diameter d, normally aligned with the respective window end 4, and centered on the respective axis A.

Cylindrical pins 5 of substantially the same diameter d and with chamfered ends pass through these holes 11. In order that the pins 5 can pass through the ends 4 of the window 15, the end of each pin 5 is formed level with the respective link plate 2 with an axially limited region 7 of reduced cross-sectional size. More specifically at each region 7 each pin 5 is formed with two parallel but diametrally opposite chordal grooves 8 having parallel planar bases 8a spaced apart by a distance d' slightly smaller than the diameter d and sides 8b lying in two planes perpendicular to the respective axis A and spaced axially apart by a distance equal to or slightly greater than the axial thickness of the link plate 2. This shape corresponds to that of the respective hole end 4 which has a pair of parallel side surfaces 4a flanking the respective axis A and spaced apart by the distance d' and a part-cylindrical end surface 4b centered on the respective axis A. Since the bases 8a of the grooves 8 are spaced apart by a distance equal to or slightly less than the spacing d' between the sides of the opening 6 at the ends 4, the pins 5 can slide into the ends from the central portion 15 which itself has parallel surfaces 15a parallel to the surfaces 4a and curved transition surfaces 15b extending between each end of the each side surface 15a and the respective surface 4a. The surfaces 15a are spaced apart by a distance d" slightly greater than the diameter d so the pin 5 can pass axially through the windows 6 at the wide central region 15.

These holes 11 may also be formed as shown at 11' in FIG. 8, that is with a minor-arc segment 26 stretching around the respective axis A over some 175° and a major-arc segment 27 that is of a diameter slightly greater than the diameter d. The segment 26 is centered on a line parallel to and concave toward the other end of the respective coupling link so that when the chain is tensioned in a longitudinal direction 3 the respective pin 5 bears on the segment 26. Since the pins 5 are fixed in the links 1 this will insure twisting of these pins 5 in the holes 11' to clean this portion of these pins 5 automatically. The two surfaces 26 and 27 are separated by a radial step whose sharp edge scrapes the surface of the central region of the respective pin 5. This arrangement is therefore largely self cleaning, and will not jam if fouled as the pin 5 can lift off the surface 26 if necessary, being displceable toward the other respective pin 5 through a distance equal to the difference between the radii of curvature of the surface portions 26 and 27.

The confronting ends 12 of the links 9 and 10 are semicylindrical and centered on the respective axes A. They are normally separated by a spacing S slightly greater than the diameter d. An entrainment element 14 having a fork 13 between the ends 12 substantially fills this space between them, keeping the reduced-size end regions 7 in the hole ends 4. This fork 13 has a pair of tines or legs 20 of a height equal to the diameter d and extending through the central region 15 of the windows 5 parallel to the axes A. To one side of the link 1 the two tines or legs 20 are welded to a large bar 19 having a height h equal substantially to that of the link 1 as best seen in FIG. 3 and to the other side they are secured via a pin 19 to an entrainment element 16 carrying or constituting a scraper plate or the like. To this end the legs 20 and element 16 are formed with aligned cylindrical holes 17 into which the pin 18 is force fitted so that these elements are solidly but releasably linked together.

Such a link assembly is put together by first inserting the end of one of the links 9 between two link plates 2 with the hole 11 aligned with the central window sections 15. A pin 5 is then inserted through the two windows 6 at the central sections 15 and through the hole 11 between them. The pin 5 is then slid along the window 4 with the link 9 toward the one end region 4, with the grooves 8 aligned with the respective links 2. The pin 5 is moved all the way to the end to seat against the part-cylindrical end surface 4b of the window 6 with the flat bases 8a of the grooves 8 parallel to and/or lying against the flat flanks 4a of the end section 4 and the groove sides 8b lying against the faces of the link plate 2.

This procedure is then repeated for the other link 9 with another pin 5.

Then the two legs 20 of the fork 13 are inserted transversely from one side through the link 5 and are secured at the other side by the pin 18 to the entrainment plate 16. As indicated in FIG. 1 this pin 18 may be threaded into one or both of the bores 17. It also may be formed by a cotter pin. In any case all forces between the various parts are therefore effective perpendicular to the direction that the parts must be displaced in relative to each other to disengage them from each other. Thus the system will not loosen. Even if the chain is allowed to go very slack, the fork 13 between the ends 12 will prevent the links 9 from moving in enough for the pins 5 to pull out of the window ends 4.

In FIGS. 4–7 another arrangement is shown with a double chain having a pair of side chains 21 and 22 each formed by a respective succession of coupling links 9 and entrainment links 1'. Each entrainment link 1' is formed of a single link plate 2 lying to the outside of the respective coupling links 9. The pins 5' here have heads 10 shaped like rivet heads and lying against the inner face of the respective link 9 and reduced-size ends 7 engaging through the respective small-size end section 4 of the window 6.

The fork 13 is here eliminated. In its place an entrainment element 14' constituted by a massive bar having a height equal to the height h of the chain and a width equal to the spacing S is used. This bar 14' is formed at its ends with shoulders 23 defining short end projections 24 of a height equal to the spacing d" and long enough to extend clear through the centers 15 of the link plates 2. These rectangular-section projecting ends 24 are formed with vertically throughgoing cylindrical-section holes 28 in which pins 25 are force fitted. The links 2 are therefore captured between the shoulders 23 and pins 25.

This system is extremely robust. Forces are transmitted effectively between the rounded ends surfaces 12 of the links 9 to the entrainment elements 14' and the links 9 and 1' are solidly but pivotally connected together for the desired flexibility needed at the ends of a conveyor or entrainment chain.

It is within the scope of the instant invention to combine any of the aspects of the embodiments of FIGS. 1–3 with that of FIGS. 4–7 or 8, or vice versa. Similarly the doubling up of the links 2 as seen in FIGS. 1–3 could be carried to an arrangement with a doubled link 9, or more than two could be used in high-tension situations.

I claim:

1. A conveyor chain comprising:

longitudinally elongated coupling links having transverse throughgoing bores;

longitudinally elongated entrainment links each being formed with a transversely throughgoing window having a relatively wide central section and a pair of opposite relatively narrow end sections centered on respective parallel and transverse axes;

coupling pins having central regions of a cross-sectional size that can fit axially through said central section but not through the end section of the respective entrainment link and ends formed with axially limited regions of reduced cross-sectional size interfittable with said ends of said windows, said limited regions having end faces axially flanking the respective entrainment link, whereby said pins pivotally connect said links together into an annular succession with said entrainment and coupling links normally alternating with each other;

respective entrainment devices extending axially through said windows between the respective pins and being of a dimension measured in the plane of the respective axes that is generally equal to the spacing between adjacent coupling links when same are engaged in the respective end sections and are generally centered on the respective axes; and means for securing said entrainment devices against axial movement relative to the respective entrainment links.

2. The chain defined in claim 1 wherein said limited regions are of noncircular cross-section and the respective end sections are complementarily shaped, said pins being nonrotatable about the respective axes in the respective entrainment links.

3. The chain defined in claim 2 wherein said coupling links have rounded ends with centers of curvature at the respective axes, said rounded ends being engageable longitudinally with said entrainment devices.

4. The chain defined in claim 3 wherein said entrainment links each include two parallel entrainment-link plates each formed with one such window and flanking the respective coupling links, said pins each being formed with two such limited regions engaged in the respective entrainment-link plates.

5. The chain defined in claim 3 wherein said limited regions are each formed by at least one chordal and radially outwardly open grooves.

6. The chain defined in claim 5 wherein said limited regions are each formed by a pair of such grooves open diametrally oppositely and having parallel bases, said end sections having parallel side surfaces generally engageable with the respective groove bases.

7. The chain defined in claim 3 wherein said window is elongated longitudinally of the respective entrainment links.

8. The chain defined in claim 3 wherein said entrainment devices each have a part engaging axially through the respective window between the respective pins, are each formed to one side of the respective entrainment link with a shoulder engaging thereagainst, and are each engaged to the other side of the respective entrainment link by the respective means.

9. The chain defined in claim 8 wherein said entrainment devices each include:

a relatively high body to one side of the respective entrainment link;

a projection extending from said body to the other side of the respective entrainment link; and an entrainment element connected by the respective means to said projection.

10. The chain defined in claim 9 wherein said projection is formed by a pair of parallel legs embracing said entrainment element, said means including respective locking bolts extending through each pair of legs and the respective entrainment element.

11. The chain defined in claim 10 wherein said pairs of legs are parallel to said axes and each longitudinally respectively engage the longitudinally preceding and following coupling links.

12. The chain defined in claim 10 wherein said legs are formed with respective bores in which the respective bolts are force fitted.

13. The chain defined in claim 10 wherein said pairs of legs are formed with respective bores at least one of which in each pair is threaded, said bolts being screwed into the respective threaded bores.

14. The chain defined in claim 9 wherein said chain is double, with two such annular successions next to each other, said bodies lying between adjacent entrainment links and each having two such projections extending through the respective adjacent entrainment links, whereby said entrainment devices lie mainly between and bridge said successions.

15. The chain defined in claim 3 wherein said transversely throughgoing bores are each at least partially cylindrical, centered on the respective axes, and of generally the same radius of curvature as the central region of the respective pin.

16. The chain defined in claim 15 wherein said bores are wholly cylindrical.

17. The chain defined in claim 15 wherein said transversely throughgoing bores each having a cylindrical surface portion concave longitudinally away from the other axis of the respective entrainment element, centered on the respective axis, and of generally the same radius of curvature as the central region, and another surface portion concave longitudinally toward the other axis of the respective entrainment element and spacedly surrounding the respective central region.

18. The chain defined in claim 17 wherein said other surface portions are cylindrical and centered on the respective axis, but of larger radius of curvature than the respective one surfaces.

19. The chain defined in claim 18 wherein said one surface portions extend over slightly less than 180°, whereby the respective pins can move limitedly longitudinally in said bores.

20. The chain defined in claim 19 wherein said bores are each formed with a radially extending step between the respective surface portions and having a sharp edge slidable along the respective central region.

* * * * *